(12) United States Patent
Senna et al.

(10) Patent No.: US 7,597,868 B2
(45) Date of Patent: Oct. 6, 2009

(54) PROCESSES FOR SINGLET OXYGEN GENERATION AND FULLERENE OXIDATION

(75) Inventors: Mamoru Senna, Yokohama (JP); Hiroto Watanabe, Yokohama (JP); Takahiro Kubo, Yokohama (JP); Eitaro Matsui, Yokohama (JP)

(73) Assignee: Keio University, Tokyo (JP)

( * ) Notice: Subject to any disclaimer, the term of this patent is extended or adjusted under 35 U.S.C. 154(b) by 0 days.

(21) Appl. No.: 11/649,715

(22) Filed: Jan. 4, 2007

(65) Prior Publication Data

US 2007/0286791 A1 Dec. 13, 2007

(30) Foreign Application Priority Data

Jun. 12, 2006 (JP) ............................. 2006-161827
Nov. 28, 2006 (JP) ............................. 2006-319531

(51) Int. Cl.
*C01B 31/00* (2006.01)
*C01B 13/02* (2006.01)

(52) U.S. Cl. .................... 423/445 B; 423/579; 977/847

(58) Field of Classification Search ............. 423/445 B, 423/415.1, 579, 460; 977/963, 842, 900, 977/962, 847

See application file for complete search history.

(56) References Cited

OTHER PUBLICATIONS

Senna, Mamoru., "Consequences of molecular strain on the solid state addition reaction," 2004, Journal of Materials Science, 39, pp. 4995-5001.*

Zhang et al., "Pressure induced reactivity change on the side-wall of a carbon nanotube: A case study on the addition of singlet O2," 2006, Carbon, 44, pp. 928-938.*

M. Orfanopoulos and S. Kambourakis, Fullerene $C_{60}$ and $C_{70}$ Photosensitized Oxygenation of Olefins, Tetrahedron Letters, vol. 13, No. 12, pp. 1945-1948, 1994.

K. M. Creegan, J.L. Robbins, W.K. Robbins, J.M. Millar R. D. Sherwood, P.J. Tindall and D.M. Cox, Synthesis and Characterization of $C_{60}O$, the First Fullerene Epoxide, The American Chemical Society 1992, 114, 1103-1105.

A.L. Balch, D.A. Costa, B.C. Noll and M.M. Olmstead, Oxidation of Buckminsterfullerene with m-Chloroperoxybenzoic Acid. Characterization of a $C_s$ Isomer of the Diepoxide $C_{60}O_2$, American Chemical Society 1995, 117, 8926-8932.

W. B. KO, S.H. Hwang and J.H. Ahn, The Oxidation of Fullerene [$C_{60}$] using Several Oxidants under Microwave Irradiation, Elastomer vol. 40, No. 1, 2005.

* cited by examiner

Primary Examiner—Wayne Langel
Assistant Examiner—Brittany M Martinez
(74) Attorney, Agent, or Firm—The Webb Law Firm

(57) ABSTRACT

Powdery fullerene is milled in an oxygen atmosphere, whereby mechanical impacts are applied to the fullerene and a carbon cage of the fullerene is dynamically distorted to the extent that an energy for conversion of atmospheric oxygen to a singlet excited state is accomplished from the distorted carbon cage to atmospheric oxygen. Singlet oxygen, i.e. an efficient oxidant in various industrial fields, is generated by solid-state reaction under stable conditions without necessity of photo-irradiation. The singlet oxygen also enables efficient oxidation of fullerene itself.

5 Claims, 3 Drawing Sheets 4-oxo-TEMP        4-oxo-TEMPO 4-oxo-TEMP        4-oxo-TEMPO spins/mg
2.2 × 10^{13}

C_{60}+4oxoTEMP
mixed
(control)

4.4 × 10^{14}

C_{60}+4oxoTEMP
UV (254nm)
1 atm O_2 for 5h 4.2 × 10^{14}

C_{60}+4oxoTEMP
milled in
1 atm O_2 for 5h untreated spins/mg
2.4 × 10^{13}

UV 5h
in O_2

4.7 × 10^{14} mill 5h
in O_2

6.8 × 10^{13}

PROCESSES FOR SINGLET OXYGEN GENERATION AND FULLERENE OXIDATION

BACKGROUND OF THE INVENTION

1. Field of the Invention

The present invention relates to a singlet oxygen generating process and also to a process of oxidizing fullerenes with the singlet oxygen.

2. Description of Related Art

Oxidation of fullerenes is a key for synthesis of organic compounds. Oxidation of fullerenes with molecular oxygen is conventionally performed by a photo-chemical process using organic dyes as photo-sensitizers. Use of the molecular oxygen as an oxidant has been regarded as promising means for clean reactions with less environmental burdens, compared with use of toxic organic or inorganic oxidants.

Fullerenes, which are recently applied to various technical fields, are also effective photo-sensitizers, as reported in Ref. No. 1. According to Ref. No. 1, singlet photo-excited fullerenes are further excited to a triplet state by intersystem crossing. The excitation is accompanied with energy transfer to oxygen, and oxygen is sequentially excited to a singlet state.

By the way, fullerenes represented by $C_{60}$, $C_{70}$ or $C_{84}$ are carbon clusters with closed shell structures (hereinafter, referred to as "carbon cages") and have peculiar physical properties originated in the specified carbon cages. For instance in a medical field, big powers for generation of singlet oxygen enable employment of fullerenes as anti-cancer drugs or anti-HIV proteases in combination with selective drug-delivery systems. In a cosmetic field, fullerenes are used as anti-active oxygen medicines similar to vitamin C due to radical-repairing powers. Moreover, development of fullerenes is also researched and examined by bonding other elements or groups to some of cage-forming carbon atoms or by enclosing other elements or groups in the carbon cages so as to change properties of fullerenes themselves.

Among oxidation processes using fullerenes as photo-sensitizers, oxidation of fullerenes is the simplest system. Since fullerene oxide has excellent activity, its applicability as an additive to battery electrodes using LUMO (a lowest unoccupied molecular orbital) lower than fullerenes is also expected, as well as precursors for functional fullerene derivatives. For instance, fullerene oxides are produced by liquid-state photo-oxidation as noted in Ref. No. 2 or by chemical oxidation with oxidants, e.g. m-chloroperbenzoic acid, as noted in Ref. No. 3. Ref. No. 4 reports another fullerene oxidizing process, wherein fullerenes are irradiated with microwaves in a solid state mixed with m-chloroperbenzoic acid.

Ref. No. 1 Michael Orfanopoulous, Spiros Kambourakis, *Tetrahedron Lett.* (1994) 35, 1945

Ref. No. 2 Kathleen M Creegan, John L. Robbins, Win K. Robbins, John M. Millar, Rexford D. Sherwood, Paul J. Tindall, Donald M. Cox, *J. Am. Chem. Soc.* (1992) 114, 1103

Ref. No. 3 Alan L. Balch, David A. Costa, Bruce C. Noll, Marilyn M. Olmstead, *J. Am. Chem. Soc.* (1995) 177, 8926

Ref. No. 4 Weon Bae Ko, Sung Ho Hwang, Ju Hyun Ahn, *Elastomer,* (2005) 40, 45.

Any method of Ref. Nos. 1-3 premises liquid-state reactions, which are unavoidably accompanied with heavy environmental burdens and unsuitable for massive synthesis of fullerene oxides since huge amounts of solvents are consumed for dissolution of sparingly-soluble fullerenes. Besides, photo-irradiation is essential for the reactions.

The other method of Ref. No. 4 is based on solid-state reactions and limits a reaction field between solids. As a result, objective compounds are produced with poor yields, and organic or inorganic oxidants were still required.

SUMMARY OF THE INVENTION

The invention is aimed at elimination of the above problems and based on the discovery that an energy is discharged from dynamically distorted fullerene. An object of the invention is to generate singlet oxygen, i.e. an efficient oxidant for various reactions, in a solid phase region under stable conditions without photo-irradiation. Another object is to perform efficient solid-state oxidation of fullerenes with the singlet oxygen.

In the inventive process, a mechanical stress is applied to powdery fullerene with a closed carbon cage in an oxygen atmosphere. The fullerene is indicated by a number of carbon atoms $C_n$ (n is an even integer of 60, 70, 84 or more).

The mechanical stress induces dynamic distortion of the carbon cage, and excites molecules of atmospheric oxygen to a singlet state. Accordingly, the singlet oxygen is generated in a solid phase region under stable conditions.

The singlet oxygen is extremely active and easily bonded to carbon-carbon double bonds, i.e. a cage-forming element of the fullerene. Consequently, the fullerene is efficiently oxidized by solid-state reaction in absence of solvents. The singlet oxygen is also useful for solid-state oxidation of other chemical compounds as well.

DETAILED DESCRIPTION OF THE INVENTION

The inventors have studied and examined generation of singlet oxygen in a solid phase region from various aspects, in order to provide an efficient oxidant for solid-state reactions.

In the course of researches, the inventors have presumed that an oxygen molecule can be excited to a singlet state by energy transfer from activated fullerene to atmospheric oxygen.

Activation of the fullerene molecule is achieved by milling powdery fullerene in an oxygen atmosphere. The milling motion imparts mechanical impacts to fullerene and dynamically distorts its carbon cage. Conventional milling devices including a ball mill with an electromagnetic oscillator is appropriate for the purpose.

Anisotropic dynamic pressure may also be applied to the fullerene for induction of the dynamic distortion, instead of the mechanical impacts. In this sense, the wording "mechanical stresses" involves mechanical impacts, anisotropic dynamic pressures and capable of inducing anisotropic molecular distortion.

Mechanical stresses have been employed as driving forces for solid-state mechano-chemical reactions, preferably in the field of inorganic materials. There are few reports, however directed to application of mechanical stresses to organic compounds. In fact, no reports have been issued on mechano-chemical reactions of molecules with 3D structures, although the reactions are theoretically explained by a decrease in a band-gap energy between HOMO (a highest occupied molecular orbital) and LUMO caused by distortions of hypothetical three-atoms linearly aligned molecules leading to orbital approaches.

Figure 1:
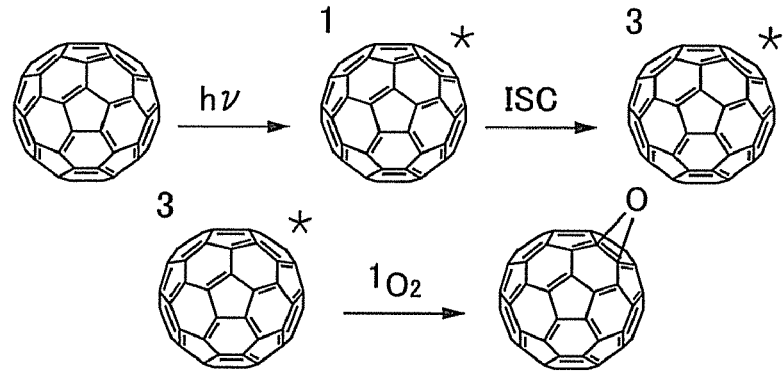
FIG. 1 is a model for oxidation of fullerene with photo-irradiation.

According to a photo-oxidation process using fullerene as a sensitizer, the fullerene is excited by photo-irradiation, and oxidation is promoted by singlet oxygen $^1O_2$ generated during the excitation, as illustrated in FIG. 1. In this concern, the inventors hit upon applicability of mechanical stresses to fullerenes, under presumption that the mechanical stresses create an excited state of the fullerene and generate singlet oxygen. The inventors have examined the presumption through milling fullerene in oxygen atmospheres.

Figure 2A:
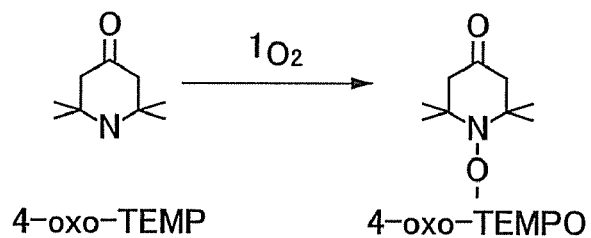
FIG. 2A is a model for trapping singlet oxygen with 4-oxo-TEMP.

The inventors have then confirmed that application of mechanical stresses to a solid-state fullerenes in an oxygen atmosphere effects excitation of atmospheric oxygen molecules and generation of singlet oxygen, as recognized by the following test:

Fullerene and 4-oxo-TEMP (4-oxo-tetramethylpyridine) were mixed and co-ground in a ball mill for application of mechanical impacts to a carbon cage of the fullerene, wherein 4-oxo-TEMP served as a scavenger, being highly reactive to singlet oxygen and easily converted to a stable 4-oxo-TEMPO free radical as a reaction product with the singlet oxygen, as noted in FIG. 2A.

Figure 3A:
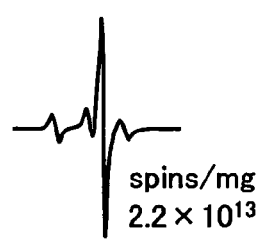
FIG. 3A is a graph indicating absence of ESR signals of 4-oxo-TEMPO free radical, when fullerene is simply mixed 4-oxo-TEMP.
Figure 3B:
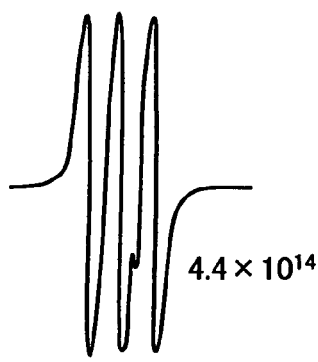
FIG. 3B is a graph indicating production of ESR signals, when fullerene is reacted with 4-oxo-TEMP under photo-irradiation in presence of oxygen.
Figure 3C:
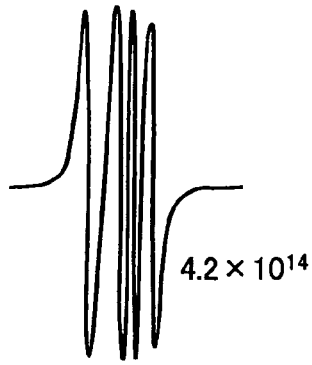
FIG. 3C is a graph indicating production of ESR signals of 4-oxo-TEMPO free radical when 4-oxo-TEMP is ground together with fullerene by a ball mill in an oxygen atmosphere.

When the ground sample was subjected to ESR (electron spin resonance) analysis, an ESR signal of the 4-oxo-TEMPO free radical was observed, as shown in FIG. 3C. The results were similar to those given by reaction of 4-oxo-TEMP with fullerene under photo-irradiation in presence of oxygen, as shown in FIG. 3B. However, any ESR signal of the 4-oxo-TEMPO free radical was not observed by simply mixing fullerene with 4-oxo-TEMP, as shown in FIG. 3A.

Figure 2B:
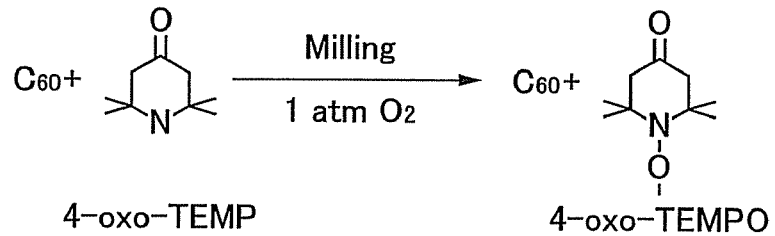
FIG. 2B is another model for trapping singlet oxygen with 4-oxo-TEMP and fullerene $C_{60}$.

The ESR signal of the 4-oxo-TEMPO free radical was selectively intensified in comparison with those obtained for simple mixing of fullerene with 4-oxo-TEMP. High intensity of the ESR signal indicates that the oxidation of fullerene occurs via singlet oxygen, since 4-oxo-TEMP selectively scavenges singlet oxygen. Therefore it is confirmed that energy transfer to atmospheric oxygen and generation of singlet oxygen are achieved by application of mechanical stresses to solid-state fullerene in an oxygen atmosphere, in a manner shown in FIG. 2B.

Figure 4A:
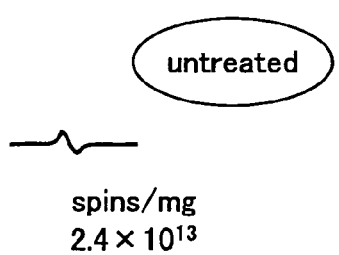
FIG. 4A is a graph indicating absence of singlet oxygen, when Rose Bengal is simply mixed with 4-oxo-TEMP.
Figure 4B:
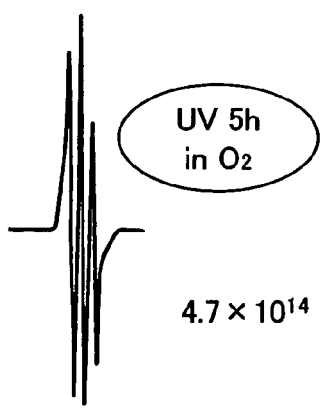
FIG. 4B is a graph indicating generation of singlet oxygen, when 4-oxo-TEMP is reacted with Rose Bengal under photo-irradiation in an oxygen atmosphere.
Figure 4C:
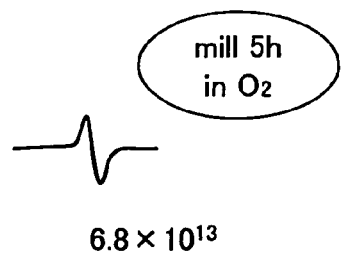
FIG. 4C is a graph indicating absence of singlet oxygen, when 4-oxo-TEMP is ground together with Rose Bengal by a ball mill in an oxygen atmosphere.

Moreover, Rose Bengal, i.e. a conventional photo-sensitive dye, was used instead of the fullerene, ground together with 4-oxo-TEMP in a ball mill in an oxygen atmosphere, under the same conditions mentioned above. Although generation of singlet oxygen was not detected, as shown in FIG. 4C, the results were the same as in a case of simple mixing Rose Bengal with 4-oxo-TEM, as shown in FIG. 4A. On the other hand, when 4-oxo-TEMP was reacted with Rose Bengal under photo-irradiation in an oxygen atmosphere, singlet oxygen was generated, as shown in FIG. 4B.

In short, in the case of Rose Bengal, singlet oxygen is generated by a photo-irradiation process using a conventional photo-sensitizer but not generated by a mechano-chemical process.

The difference between Rose Bengal and fullerene for generation of singlet oxygen is explained by the difference in the 3D molecular structures of Rose Bengal and the fullerene. Rose Bengal has a flat π-conjugated plane, while fullerene has a spheroidal n-conjugated system, subjected to easier molecular distortions under mechanical stress to induce a remarkable change in molecular orbitals. Consequently, the fullerene molecule is activated by mechanical stresses, and an energy enough to excite atmospheric oxygen molecule to a singlet state is transferred from the activated fullerene to the atmospheric oxygen.

Creation of fullerene oxides is essential in order to progress application and development of fullerene related technology. Fullerene oxide is obtained by application of mechanical stresses to powdery fullerene in an oxygen atmosphere, whereby the fullerene is activated due to dynamic distortion of its carbon cage, and atmospheric oxygen is excited to a singlet state, so as to promote reactions between the resultant singlet oxygen molecules and cage-forming carbon-carbon double bonds of the fullerene.

After the fullerene is minutely pulverized by the ball mill in an oxygen atmosphere, it is washed with liquid carbon disulfide having a strong solubility of the fullerene. An insoluble fraction is separated from the carbon disulfide by centrifugation and dried to obtain fullerene oxide. A wash liquor may be an aromatic solvent, e.g. toluene or benzene, instead of carbon disulfide.

Analytical results of the supernatant solution and the recovered dry powder suggest that the fraction insoluble in carbon disulfide is fullerene oxide.

Figure 5:
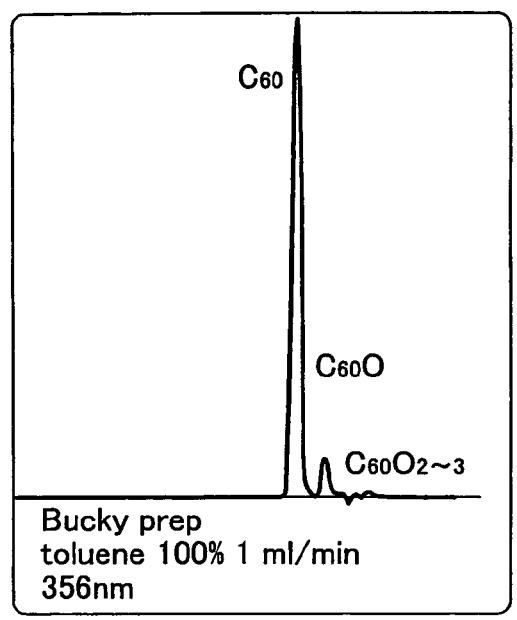
FIG. 5 is a HPLC (high performance liquid chromatography) chart of a supernatant of centrifugation.

When a supernatant solution, provided by washing fullerene oxide $C_{60}O_n$ with carbon disulfide, is subjected to HPLC (high-performance liquid chromatography) analysis, it is understood that soluble fractions in carbon disulfide are unreacted fullerene $C_{60}$ and a small amount of fullerene epoxides $C_{60}O_{1-3}$, i.e. low-level oxides, as shown in FIG. 5.

Figure 6:
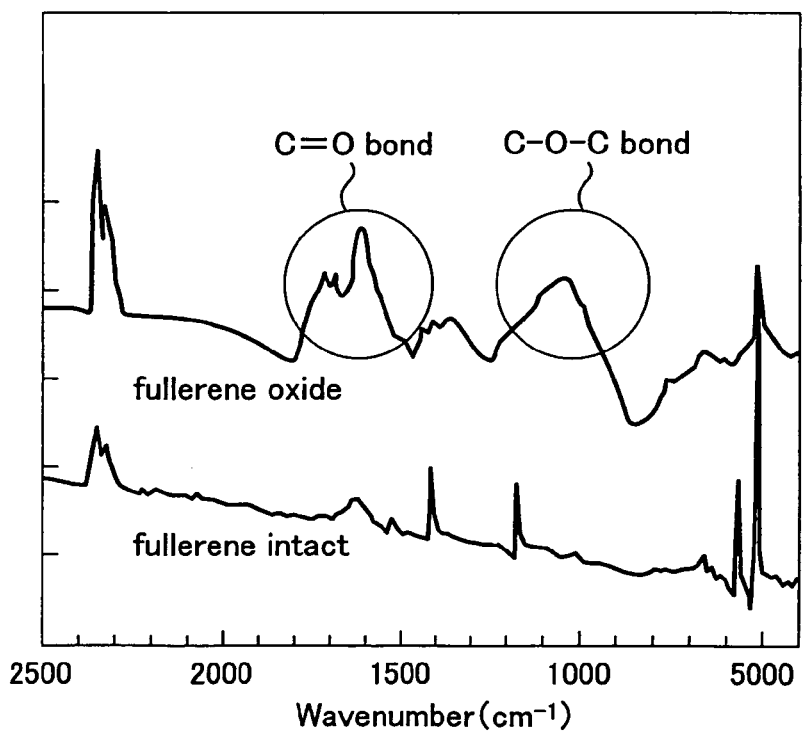
FIG. 6 is IR spectrum of fullerene oxide and fullerene.

The recovered dry powder is analyzed as such by infrared spectroscopy with potassium bromide KBr. The resulting spectrum proves that the insoluble powder has an absorption band of C=O bond other than a stretching mode of C—O—C bond (similar to a bond of an epoxide synthesized by photo-oxidation), as noted in FIG. 6. In short, fullerene oxide, having an averaged composition of $C_{60}O_{8.6}$ and a structure wherein oxygen atoms are bonded to cage-forming carbon atoms of the fullerene in a ketone state, is produced by milling powdery fullerene in an oxygen atmosphere.

A ball mill equipped with an electromagnetic oscillator is especially appropriate for application of a mechanical stress to powdery fullerene. Intensity of the mechanical stress (in other words, an imparted energy) is freely adjusted by controlling an input to the oscillator. Dynamic distortions of carbon cages may be also performed by application of anisotropic dynamic pressures instead of the mechanical impacts. The anisotropic pressure distorts the carbon cages from its perfectly spherical geometry. Consequently, the carbon cage is charged with an energy enough to excite atmospheric oxygen to a singlet state.

The imparted energy is necessarily at least about 1.63 eV, corresponding to an energy gap between lowest triplet-excited state and ground state, in order to distort a carbon cage of the fullerene to an extent capable of transforming an energy to atmospheric oxygen or to efficiently oxidize the fullerene itself.

However, application of an excess energy is often unfavorable. For instance, if an excess energy is applied to fullerene in a ball mill, the fullerene is affected by side reaction. Abrasion of milling media such as milling balls and a vessel can contaminate processed fullerene. Furthermore, application of a too-high pressure often induces polymerization of the fullerene itself Likewise if the fullerene is ground in the ball mill with a heavy duty, it is often polymerized due to large shearing stresses.

The optimum conditions for oxidation of fullerenes are variable depending on the milling methods. Since a magnitude of an imparted energy is not simply specified with relevant to each milling method, it is preferably determined each time to optimize milling conditions to minimize pulverization regarded as an undesirable side reaction.

According to the invention as above-mentioned, singlet oxygen is generated by applying mechanical stress to a carbon cage of fullerene in an oxygen atmosphere so as to dynamically distort the carbon cage and to transfer energy from the distorted carbon cage to atmospheric oxygen. The singlet oxygen efficiently oxidizes fullerene itself in a solid phase.

Due to the solid-state oxidation, fullerene is processed with less environmental burdens without presence of solvents in a reaction system. In the case where photo-oxidation is performed in a solid region using a photo-sensitizer, absorption of photon energy must occur on surfaces of solid, resulting in a significant decrease of a reaction efficiency. According to the invention on the other hand, fresh surfaces are continuously exposed by repetition of mechanical stresses, and oxygen molecules are easily intercalated in internal spaces of fullerene crystal, resulting in continuous generation of active species.

The other features of the invention will become apparent from the following example. It must be understood that the illustrated embodiment has been set forth only for the purposes of examples and that it should not be taken as limiting the invention as defined by the claims.

EXAMPLE 1

500 mg of powdery fullerene $C_{60}$ (NANOM PURPLE offered by Frontier Carbon Co., Ltd.) was put into the vessel of an electromagnetic ball mill (PULVERISETTE 0 offered by Fritsch Co., Ltd.) using an agate ball of 50 mm in diameter as milling medium. The ball mill was shielded to prevent from photo-irradiation (day light) and driven for 5 hours in an oxygen atmosphere of 1 atm. under oscillations with an amplitude of 2 mm and a frequency of 50 Hz.

Thereafter, 10 mg of the pulverized fullerene was taken and dissolved in toluene of 50 ml. An insoluble fraction was recovered by centrifugation and dried. A supernatant, i.e. a toluene solution of fullerene, was subjected to HPLC analysis (Bucky Prep., using toluene as a mobile phase, offered by Nakarai Techs., Co., Ltd.) to determine the amount of unreacted fullerene. The analytical result indicated a fractional conversion of 68%. By elemental analysis of the recovered powder from the insoluble part revealed, the recovered powder was fullerene oxide with an average composition of $C_{60}O_{8.6}$.

EXAMPLE 2

Effects of milling conditions on oxidation of fullerenes were examined in Example 2.

The same ball mill as Example 1 was used either with an agate ball of 170 g or a stainless steel ball of 507 g therein. Both of the milling balls were 50 mm in diameter. 500 mg of fullerene was put into the ball mill and pulverized while holding an interior of the ball mill in an oxygen atmosphere and vertically oscillating the ball mill at their amplitudes either 0.5 mm or 2.0 mm.

Fulleren was pulverized under the milling conditions given in Table 1, and subjected to HPLC analysis to determine fractional conversions to fullerene oxides and production rates of by-produced fullerene epoxide ($C_{60}O$). Average numbers of oxygen atoms in fullerene oxides were also detected by elemental analysis. In Example 2, fractional conversions to fullerene oxides were calculated from integral peak intensity of fullerenes given by HPLC. These results are also shown in Table 1.

Results of Table 1 indicate the tendency that both the fractional conversions to fullerene oxides and the average numbers of oxygen atoms in fullerene oxides become larger with increased milling time and amplitude.

As for milling balls, both the fractional conversions and the numbers of oxygen atoms in fullerene oxides were larger with the stainless steel ball as compared with the agate ball. The differences between the stainless steel and agate balls are explained by the intensity of mechanical impacts. The stainless steel ball gives larger impacts due to larger density. Especially when powdery fullerene was pulverized for 3 hours in a ball mill with the stainless steel ball under an amplitude of 2 mm, almost all of the fullerene was converted into fullerene oxide. These results prove that the fullerene-oxidizing reaction is very susceptible to the intensity of mechanical stress.

TABLE 1

Effects of Milling Conditions on Oxidation of Fullerenes

| Kind of Milling ball | Amplitude (mm) | Milling time (hrs.) | Fractional Conversion (%) | Generation rate (%) of fullerene epoxide $C_{60}O$ | Average Number of Oxygen Atoms (n) in Insoluble Fraction $C_{60}O_n$ |
|---|---|---|---|---|---|
| Agate | 0.5 | 1 | Trace | 0 | — |
| " | 0.5 | 3 | 3 | 0.4 | — |
| " | 0.5 | 5 | 7 | 2.1 | 3.3 |
| " | 2 | 1 | 11 | 0 | — |
| " | 2 | 3 | 25 | 1.7 | 1.4 |
| " | 2 | 5 | 68 | 1.5 | 8.6 |

TABLE 1-continued

Effects of Milling Conditions on Oxidation of Fullerenes

| Kind of Milling ball | Amplitude (mm) | Milling time (hrs.) | Fractional Conversion (%) | Generation rate (%) of fullerene epoxide $C_{60}O$ | Average Number of Oxygen Atoms (n) in Insoluble Fraction $C_{60}O_n$ |
|---|---|---|---|---|---|
| Stainless steel | 0.5 | 1 | Trace | 0 | — |
| | 0.5 | 3 | 3 | 0.4 | — |
| | 0.5 | 5 | 45 | 0 | 9.2 |
| | 2 | 1 | 48 | 2 | 2.9 |
| | 2 | 3 | 98 | 0 | 11.5 |
| | 2 | 5 | >99 | 0 | 12.4 |

The invention claimed is:

1. A singlet oxygen generating process, comprising the steps of:
    applying mechanical stress to powdery fullerene in an oxygen atmosphere,
    dynamically distorting a closed carbon cage of the fullerene, and
    exciting an oxygen molecule to a singlet state through the application of mechanical stress to the powdery fullerene.

2. The singlet oxygen generating process of claim 1, wherein the mechanical stress is a mechanical impact applied to the powdery fullerene by grinding the powdery fullerene in a ball mill.

3. The singlet oxygen generating process of claim 2, wherein the mechanical impact is applied to the powdery fullerene by grinding the powdery fullerene in a ball mill with an electromagnetic oscillator.

4. The singlet oxygen generating process of claim 1, wherein the mechanical stress is an anisotropic dynamic pressure applied to the closed carbon cage of the powdery fullerene.

5. A fullerene oxidizing process, comprising the steps of:
    applying mechanical stress to powdery fullerene in an oxygen atmosphere,
    dynamically distorting a closed carbon cage of the fullerene,
    exciting an oxygen molecule to a singlet state through the application of mechanical stress to the powdery fullerene, and
    bonding the singlet oxygen to a cage-forming carbon atom of the fullerene.

\* \* \* \* \*